United States Patent
Ahmed et al.

[11] Patent Number: 5,852,769
[45] Date of Patent: Dec. 22, 1998

[54] CELLULAR TELEPHONE AUDIO INPUT COMPENSATION SYSTEM AND METHOD

[75] Inventors: Syed Arif Ahmed, Camas; Douglas James Millar, Vancouver, both of Wash.

[73] Assignees: Sharp Microelectronics Technology, Inc., Camas, Wash.; Sharp Kabushiki Kaisha, Osaka, Japan

[21] Appl. No.: 946,807

[22] Filed: Oct. 8, 1997

Related U.S. Application Data

[63] Continuation of Ser. No. 569,936, Dec. 8, 1995, abandoned.

[51] Int. Cl.[6] .................................................. H01G 11/12
[52] U.S. Cl. ........................ 455/115; 455/116; 455/127; 381/109
[58] Field of Search .............................. 455/95, 115, 116, 455/127, 550, 570, 501; 381/109, 112, 122, 123

[56] References Cited

U.S. PATENT DOCUMENTS

| | | | |
|---|---|---|---|
| 3,786,200 | 1/1974 | Camenzind | 381/112 |
| 4,019,150 | 4/1977 | Lurey et al. | 455/117 |
| 4,051,325 | 9/1977 | Mafune et al. | 379/390 |
| 4,119,797 | 10/1978 | Wollert | 455/116 |
| 4,955,055 | 9/1990 | Fujisaki et al. | 379/390 |
| 5,095,541 | 3/1992 | Aisaka et al. | 455/127 |
| 5,130,665 | 7/1992 | Walden | 381/109 |
| 5,152,004 | 9/1992 | Vaisnen et al. | 455/127 |
| 5,189,704 | 2/1993 | Krauss | 381/109 |
| 5,212,722 | 5/1993 | Murata | 379/58 |
| 5,230,089 | 7/1993 | Kindinger et al. | 455/116 |
| 5,313,661 | 5/1994 | Malmi et al. | 455/232.1 |
| 5,337,006 | 8/1994 | Miyazaki | 455/126 |
| 5,388,152 | 2/1995 | Kawauchi | 379/157 |
| 5,410,265 | 4/1995 | Jain et al. | 381/109 |

*Primary Examiner*—Reinhard J. Eisenzopf
*Assistant Examiner*—Sam Bhattacharya
*Attorney, Agent, or Firm*—Gerald Maliszewski; David C. Ripma

[57] ABSTRACT

A cellular telephone transmitter is provided, including a selectable gain microphone amplifier, to transmit vocal signals to the receiver of a communicating telephone. The telephone transmitter including a variable gain amplifier to amplify the vocal signal picked up by the microphone, a gain controller to vary the gain of the amplifier, and a selector associated with the gain controller which allows the telephone user to choose the gain of the amplifier. The telephone user intermittently activates the selector, while speaking, to choose an amplifier gain level appropriate to the volume of the input vocal signal. In particular, the user can elect to temporarily boost the gain while whispering into the phone. A method is also disclosed.

45 Claims, 2 Drawing Sheets

CELLULAR TELEPHONE AUDIO INPUT COMPENSATION SYSTEM AND METHOD

This application is a continuation of Ser. No. 08/569,936, filed Dec. 8, 1995, now abandonded.

BACKGROUND AND SUMMARY OF THE INVENTION

This invention relates generally to cellular telephones for communicating audio signals, and more particularly to a system of controlling audio signals in a cellular telephone transmitter to compensate for low volume audio input levels.

Cellular telephones, and telephones in general, are designed with a microphone to accept audio inputs from the telephone user and a speaker to provide an audio output to the telephone user. For most customary uses of cellular telephones these audio inputs and outputs are predominately in the form of vocal communications. The microphone is the audio input to the transmitter section of the telephone, and the speaker is the audio output of the receiver section of the telephone. Typically, the transmitter and receiver, or at least major portions of the transmitter and receiver, are co-located in a telephone handset.

For simplicity of design and convenience to the telephone user, the gain and power levels of the microphone and speaker levels are generally fixed. These fixed levels have been chosen to adequately communicate a normal conversational level vocal input. That is, the transmitter has been designed to provide a signal sufficient to drive the speaker of the communicating receiver at a predetermined power level in response to a predetermined audio input level into the microphone. It is assumed, and generally valid, that the vocal inputs of the normal telephone user will fall within the predetermined microphone input range to which the telephone's audio systems have been designed. Likewise, it is assumed that predetermined audio output levels from the speaker of the telephone are adequate to satisfy the needs of a normal telephone user. Since the telephone has a long history of use, the predetermined, or normal, audio input and output power levels are well understood. In some countries, such as Europe, these normal audio levels are codified into telephone specifications.

Audio communications between telephone users can be interrupted if abnormal audio levels are input to the telephone transmitter microphone. Abnormal audio input levels, especially low volume levels, often result in unintelligible audio signals output from the speaker of the receiver of the receiving telephone. Speaker phones correct a related problem of communicating a normal volume vocal input generated at distance relatively far from the phone's microphone. The volume control for a speaker phone simultaneously adjusts the transmitted and received audio signal based on the assumption that the user will desire a louder output from the speaker in situations requiring an increase in the microphone gain. Many speaker phones also use automatic gain control (AGC) to track the power level of the audio input and control the audio amplification in the transmitter. In this manner the speaker phone provides an audio signal to receiver of the telephone listener that is, more or less, a constant audio amplitude so as to accept vocal inputs from a gathering of several users speaking at a variety of audio input levels. However, a speaker phone provides no help to a user that desires to adjust the volume level of the transmitter audio signal only, without adjusting the volume heard on the user's receiver speaker. Likewise, a speaker phone with adjustable audio control is not practical for a user desiring the size and convenience of a handset type telephone.

To address the problem of variations in audio input to a telephone transmitter, some handset type telephones are provided with a receiver volume control. The volume control allows the telephone user to adjust the audio level that comes out of the receiver's speaker. As a result, the telephone user is able to adjust the receiver in response to the transmitted audio signal. However, many handsets are not equipped with the adjustable receiver control and, even when so equiped, it is not practical to expect the telephone listener to anticipate, and compensate for, variations in the transmitted audio signal. In addition, the signal to noise ratio of the signal heard by the telephone listener cannot be improved in the listener's telephone receiver, only the volume level can be increased. In situations where the telephone user speaks in a whisper, the signal to noise ratio of the resultant message heard by the listener can only be improved by compensation in the speaker's transmitting phone.

One prior art technique for addressing the problem of variations in audio input is disclosed by Kawauchi in U.S. Pat. No. 5,388,152. This patent discloses a key telephone with adjustable receiver volumes. No disclosure is made for adjustment or control of the audio transmit signal.

Malmi et al., U.S. Pat. No. 5,213,661, disclose a mobile telephone with adjustable receiver control. No disclosure is made for adjustment or control of the audio transmit signal.

Murata, U.S. Pat. No. 5,212,722, discloses a hands-free type telephone with feedback circuitry to simultaneously adjust receiver and transmitter volume levels. The gain of the transmitter audio circuitry is dependent on the audio levels output from the speaker. Thus, no disclosure is made concerning audio transmitter control independent of the receiver audio output signal.

Fujisaki and Shimada, U.S. Pat. No. 4,955,055, disclose a loud speaker type telephone in which the transmitter and receiver audio levels are controlled by a comparator based control signal. The gain of the transmitter audio circuitry is dependent on the audio levels output from the speaker. No disclosure is made concerning audio transmitter control independent of the receiver audio output signal.

None of the prior art inventions disclose a method of controlling the transmitter audio signal independent of the receiver audio signal. Likewise, none of the prior art inventions disclose a means of maintaining a good communication link when the telephone user must apply low level audio signals or highly variable levels to the microphone of a telephone handset.

It would be advantageous if the user of the transmitting telephone were able to control the power level of the transmitted audio signal. Prior art handsets, having uniform gain audio transmitters, are unable to clearly communicate vocal signals that are far above, or far below, normal auditory levels. It would be advantageous if the signal to noise ratio of a message received by the receiver of a communicating phone as the result of a low volume audio input into a telephone transmitter could be improved. Likewise, it would be advantageous if the telephone user was able to select the required transmit audio signal gain level independent of the audio signal output from user's receiver speaker.

Accordingly, a telephone has been provided which includes a transmitter for transmitting information, the information selectably including audio signals from the microphone incorporated into the telephone. The transmitter comprising an audio amplifier having an input operatively connected to the microphone to receive audio signals and an output for providing an amplified signal for transmission, said amplifier having a gain which is selectable and a gain control input to which gain selection information is supplied for use in setting the gain of said amplifier. The transmitter also comprising a gain controller operatively connected to the gain control input of said amplifier for supplying gain control information to said amplifier, and a user operable selector operatively connected to said controller for selecting the gain of said amplifier.

The present invention provides multiple audio amplifier gain levels to choose from. The gain selection is clone with a conveniently manipulable switch which the telephone user intermittently engages in the course of a telephone conversation. In one preferred embodiment, the telephone user is given the option of two transmitter audio gain levels. The first gain level corresponding to the normal fixed gain level of prior art telephones. The selection of a second gain level, enables the telephone's whisper-mode™, to provide the transmitter with enough amplification to clearly transmit a whispered audio input at the convenient touch of a button or a switch.

In one preferred embodiment of the present invention the user is provided with an indication of the strength of the transmit audio signal. In this manner, the telephone user who has selected the transmitter to operate at high gain is notified of whether their speech is too loud or if the amplifier gain is too high.

Other alternative embodiments are also possible within the scope of the present invention in the from of additional features such as an AGC gain selection to amplify a whispered vocal input to a telephone, an AGC gain selection to reduce the audio amplifier gain in response to loud input signals, and a high gain selection that automatically reverts to normal amplifier gain when the user's vocal input changes, from a whispered, to a normal volume.

A method has been provided of compensating for a low volume input into the microphone of a telephone, wherein the audio signal output from the microphone interferes with audible communications when the telephone transmits a signal carrying the voice input as part of operative communication with another telephone. The method comprising providing user selectivity in the gain of an amplifier operatively connected between the microphone of the telephone and the transmitter which transmits the signal carrying the voice input, and selectively increasing the gain of said amplifier in response to a user activated input, the input being selectively activated when the user determines that the volume of the voice input is low enough to interfere with audible communication via the telephone, whereby the audio signal supplied to said amplifier from the microphone is boosted to compensate for the low volume voice input.

The method of the present invention provides a means of selecting multiple audio amplifier gain levels that are engaged during a telephone conversation with the manipulation of a switch. In one preferred embodiment, the user selects from two transmitter gain levels, the first gain for use with normal conversational input levels, and a second, higher, gain called the whisper-mode™ for use with whispered audio inputs.

In one preferred embodiment of the present invention a method is provided for indicating, to the telephone user, the power level of the transmitted audio signal so that the user is notified of whether their speech is too loud or the amplifier gain too high.

Other alternative embodiments possible within the scope of the present invention, in the form of additional optional features, include a method of selecting AGC to compensate for low volume input levels into the microphone, a method of selecting AGC to limit the power of the transmitted audio signal for high volume input levels, and a method of automatically switching from high, to low, audio gain in the event that the speaker reverts to normal conversational volume levels.

DETAILED DESCRIPTION OF THE PREFERRED EMBODIMENT

Figure 1:
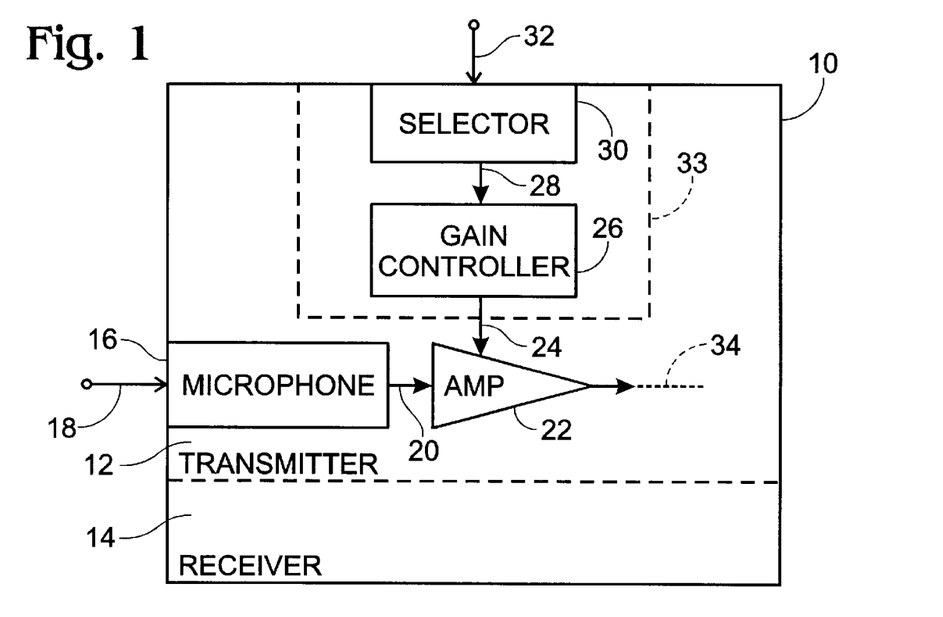
FIG. 1 is a block diagram of a cellular telephone with audio input compensation in accordance with the present invention.

FIG. 1 illustrates a block diagram of a telephone, or handheld cellular telephone, with audio input compensation in accordance with the present invention. A telephone 10 includes a transmitter section 12 to transmit information including audio signals, and a receiver section 14 to receive information including audio signals. A microphone 16 accepts predominantly vocal inputs at various volumes on line 18 from a telephone user, and outputs an audio signal on line 20. The definition of audio levels is somewhat arbitrary and subjective, however, generally acknowledged standards exist. The threshold of hearing is approximately 0 dB, a voice whisper is approximately 20–30 dB, a loud sound is approximately 90–100 dB, and the pain threshold for sound occurs at approximately 120 dB. Typical telephones transmitters are designed to optimally accept an averaged audio input of approximately 60–90 dB in the frequency range between 350 and 3000 Hz.

The audio signal on line 20 is accepted by a transmitter audio amplifier 22. Amplifier 22 is a variable gain amplifier, having a gain control input responsive to gain control information, on line 24, to select the gain of amplifier 22. Amplifier 22 may be a single amplifier, or a chain of amplifiers. A gain controller 26 provides the gain control information on line 24. In an amplifier 22 where the gain is determined by voltage or current associated with the gain control information on line 24, gain controller 26 may be a resistor or potentiometer which varies the voltage or current levels. A gain selector drive on line 28 is input to gain controller 26 to determine amplifier 22 gain. The gain selector drive on line 28 is provided by a user-operable selector 30. Selector 30 exists in forms including a dial to manipulate a potentiometer, not shown, operating as gain controller 26, or a switch to select a resistor and voltage combination, not shown, functioning as gain controller 26. Selector 30 and gain controller 26 are combined in some forms of the invention to form a gain selector 33. One gain selector 33 form is that of a two position switch that connects the gain control input of amplifier 22 to either a, first voltage level, not shown, to select a first amplifier gain, or a second, different, voltage level to select a second, different, amplifier gain.

The gain of amplifier 22 is ultimately determined by a user controlled operation, or user input on line 32. The user input on line 32 includes the physical manipulation of selector 30 in the form of a dial, switch, keypad, or the like.

Since user input on line 32 controls selector 30, selector 30 is operable in a manner independent of audio signals used in receiver section 14 of telephone 10. In one preferred embodiment of the present invention, the user input on line 32 is the motion of depressing, with a finger, a momentary contact push-button switch mounted on the case of telephone 10 to function as selector 30 for the selection of either a normal or high gain for amplifier 22. The user selects the normal, default, gain selection by not depressing switch selector 30 to optimally communicate an audio signal on line 20 with a power level greater than a predetermined minimum normal threshold. In the normal gain setting amplifier 22 is set to a first gain level. The user selects the high gain selection by depressing switch selector 30 to optimally communicate an audio signal on line 20 with a power level less than the minimum normal thresholds. In the high gain selection the gain of amplifier 22 is set to a second gain, a predetermined amount greater than the first gain. Alternate embodiments of the invention allow a user to operate a multiple position selector 30 to select the gain of amplifier 22 from a large variety of gain levels.

Amplifier 22 provides an amplifier output, or an amplified signal on line 34. The power level of the amplified signal on line 34 is determined by both, the volume level of vocal input on line 18, and the gain of amplifier 22. The amplified signal on line 34 is further processed in transmitter 12, and prepared as a signal for transmission to the receiver of a communicating telephone.

The signal to noise ratio of a signal is not improved when the intended audio information level is increased without an accompanying increase in the differentiation between intended audio information and noise. Despite a lack of improvement in the signal to noise ratio, in some situations an increase in volume at the receiver output provides an improvement in understanding to a listener. This improvement can be accomplished by simply increasing the volume in the receiver telephone. However, in many cases increasing the receiver gain of the receiving telephone is not useful for a listener hearing a low audio input transmitted signal. The present invention is of value because it is able to improve the signal to noise ratio of a whispered audio input in situations where the amplified signal is less than a predetermined minimum threshold for the amplified signal. In these situations subsequent circuitry including the radio communication link, not shown, in transmitter portion 12 will degrade, or lower, the signal to noise ratio of the transmitted signal. By increasing the gain of these low volume inputs, with amplifier 22, the resultant amplified signals become sufficiently large in the subsequent circuitry of transmitter section 12 to improve the signal to noise ratio of the transmitted signal. The resultant audio signal heard through the speaker of the receiver telephone is both, louder than a signal sent without additional transmitter gain, and likely to have a better signal to noise ratio than would result from just increasing the gain in the receiver of-the receiving telephone.

Figure 2:
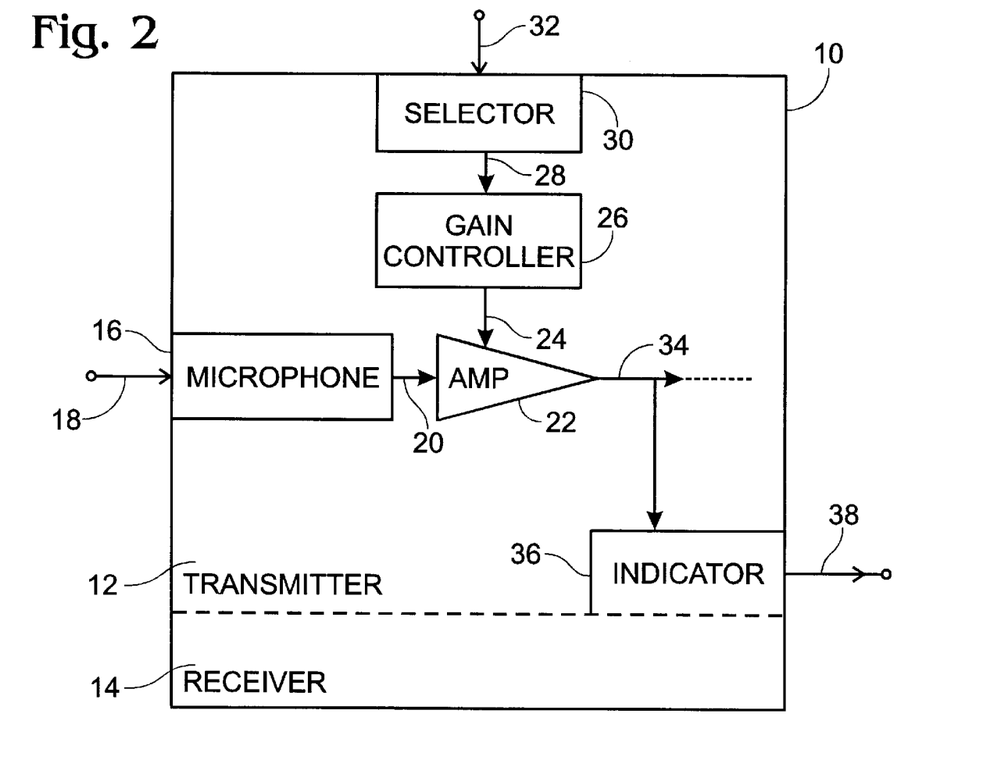
FIG. 2 is the cellular telephone with audio input compensation of FIG. 1 including a transmitter audio power indicator.

FIG. 2 is a cellular telephone with audio input compensation as in FIG. 1, including a transmitter audio power indicator 36 to warn the user of the status of the amplified signal power level on line 34. The output of amplifier 22 is operatively connected to indicator 36 to provide the amplified signal as an input to indicator 36. Indicator 36 monitors the power levels of amplified signal on line 34 and provides an indicator signal on line 38 which is proportionally responsive to the power level of amplified signal on line 34. The indicator signal on line 38 includes the possibilities of a digital readout, a dial reading on a calibrated meter, or an audio tone from the user's receiver speaker with a volume level responsive to the power level of amplified signal on line 34. In one preferred embodiment, the indicator signal on line 38 is an audio tone triggered when the power level of amplified signal on line 34 exceeds a predetermined maximum normal threshold for the amplified signal which gives the user an indication that the transmitted audio information is distorted. Distortion due to large amplified signal is typically caused by the necessity of other circuitry, not shown, in transmitter section 12 to clip, or limit, the amplified signal to an amplitude no greater than the maximum normal threshold for the amplified signal so that portions of the signal are lost. In another preferred embodiment the indicator signal on line 38 is responsive to the user selection of a high gain level for amplifier 22, in combination with, the power level of the amplified signal on line 34 exceeding the maximum normal threshold.

Alternately, the indicator signal on line 38 is the sidetone heard by the telephone user in the receiver speaker so that the telephone user is able to monitor the sound of their own voice to determine the power level of amplified signal on line 34.

Figure 3:
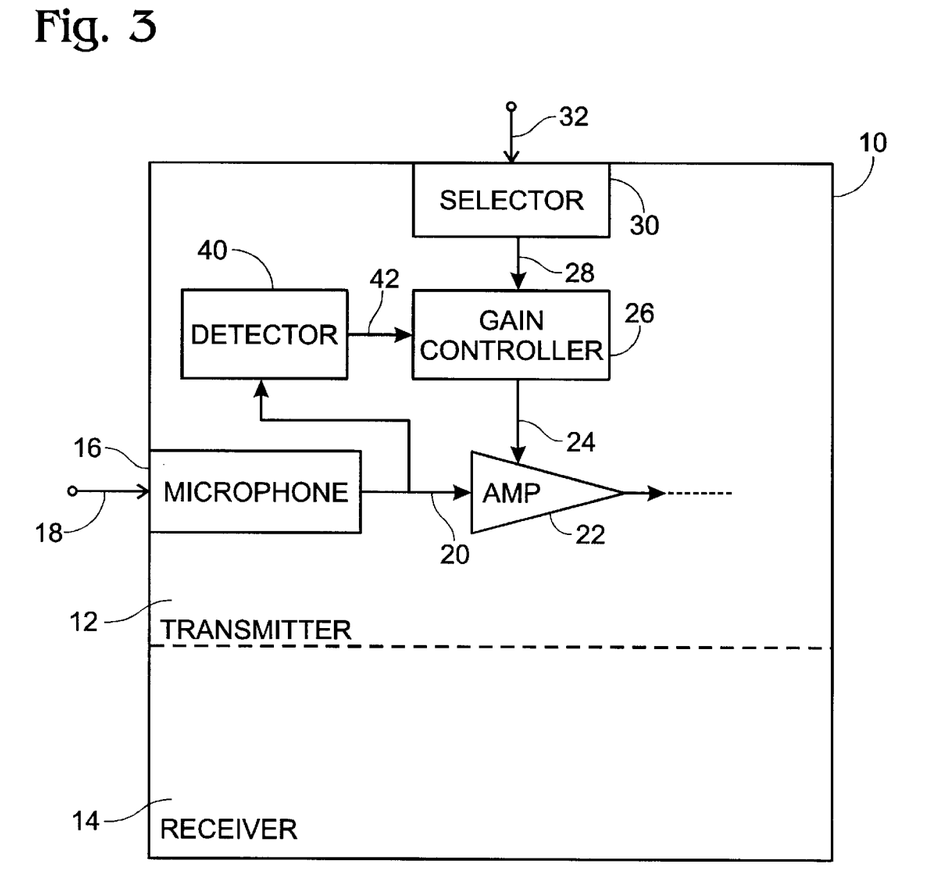
FIG. 3 is the cellular telephone with audio input compensation of FIG. 1 including an audio signal power detector circuit.

FIG. 3 is the cellular telephone with audio input compensation as in FIG. 1 including an audio signal power detector circuit 40 that is useful in AGC, or automatically controlling the gain level of amplifier 22. The audio signal on line 20 is operatively connected to detector 40 to input the audio signal into detector 40. Detector 40 measures the power level of the audio signal on line 20. Detector 40 provides a detector output signal on line 42 which is responsive to the power level of the audio signal on line 20, and operatively connected to gain controller 26. User input on line 32 optionally selects the gain of amplifier 22 to be automatically compensated and responsive to the detector output signal on line 42. Gain controller 26, when selecting an AGC gain selection, compares the detector output signal on line 42 to a reference power level, not shown, to vary the gain of amplifier 22, so as to maintain the power level of the amplified signal on line 34 within a predetermined, or normal, range of power levels. AGC has long been applied to other, related, audio circuitry such as tape recorders accepting inputs from a microphone, and is well understood in the art.

The power level of the audio signal on line 20, as measured by detector 40, is defined as having a normal power level as represented by an audio signal with a power level within minimum normal and maximum normal power levels. In a preferred embodiment of the invention the user input on line 32 is the depression of a momentary contact push-button switch mounted on the case of telephone 10 to function as selector 30 for the selection of either a normal or AGC controlled first automatic gain for amplifier 22. The user selects the normal, default, gain selection by not depressing switch selector 30 to correspond to an audio signal on line 20 with a power level greater than a predetermined minimum normal threshold. In the normal gain setting amplifier 22 is set to a first gain level. The user selects the first automatic gain selection by depressing switch selector 30 to correspond to an audio signal on line 20 with a power level less than the minimum normal thresholds. In selecting the first automatic gain, the gain of amplifier 22 is varied in a manner inversely proportional to the power level of the audio signal on line 20 to provide a relatively constant amplified signal power level on line 34.

In another preferred embodiment of the invention the user is provided with at least the selection of an AGC controlled second automatic gain selection for amplifier 22. With the second automatic gain selection, gain controller 26 selects the normal, default, gain selection to correspond to an audio signal on line 20 with a power level less than a predetermined maximum normal threshold. In the normal gain setting amplifier 22 is set to a first gain level. When the audio signal on line 20 has a power level greater than the maximum normal thresholds, gain controller 26 varies the gain of amplifier 22 in a manner inversely proportional to the power level of the audio signal on line 20 to provide a relatively constant amplified signal power level on line 34. In this manner, the information transmitted via the telephone remains free of distortion even if the speaker holds the microphone close to their mouth, or speaks loudly.

In another preferred embodiment of the invention the user is provided with at least normal and high gain with override selections to set the gain of amplifier 22. The user selects the normal, default, gain selection to correspond to an audio signal on line 20 with a power level greater than a predetermined minimum normal threshold. In the normal gain selection amplifier 22 is set to a first gain level. The user selects the high gain with override selection to correspond to audio signals on line 20 having a power level less than a predetermined minimum normal threshold. In the high gain selection amplifier 22 is set to a second gain level, a predetermined amount greater than the first gain. Detector 40 monitors the power level of the audio signal on line 20 and automatically reselects the normal gain selection when both the following events occur:

1) the user has selected the high gain selection, and
2) the power level of the audio signal on line 20 exceeds the minimum normal threshold.

In this manner, the telephone user who has selected a high gain level in order to communicate a whispered vocal input is protected from transmission of distorted information if the speaker's vocal input level returns to normal conversational levels.

Still referring to FIG. 3, in an alternate embodiment of the invention, detector 40 is operatively connected to the output of amplifier 22, instead of to the input, to detect the power level of the amplified signal on line 34, and to provide input to gain controller 26 which is used to control the gain of amplifier 22 in response to the amplified signal on line 34.

Referring to FIG. 2, in an alternate embodiment of the present invention, indicator 36 is operatively connected to the input of amplifier 22 to accept the audio signal on line 20. The power level of amplified signal on line 34 and, ultimately, the indicator signal display on line 38 is calculated by a determination of the power level of the audio signal on line 20, in combination with the gain level of amplifier 22.

The present invention represents an improvement over prior art devices since the telephone user is able to adjust the gain of transmitter audio circuitry to suit a variety of vocal input levels. In this manner, a telephone user can communicate to a listener in situations where the speaker is only able to whisper, such as in a conference or in a theater where there is a low level of background noise. The present invention is able to accomplish this gain change with a convenient touch of a switch while the user is speaking. In many situations the gain increase provided by the present invention is able to, not only increase the volume of the audio signal heard by the listener, but also to improve the signal to noise ratio. Alternately, the present invention can switch in an AGC circuit to compensate for low audio levels. The present invention is able to warn the user of excess transmitter audio gain, such as in a situation where the user has selected high gain for a whispered transmission and subsequently increases their vocal input to normal conversational levels. Alternate embodiments of the present invention automatically return the telephone transmitter gain, from high, to normal levels in the presence of normal conversational inputs. Another alternate embodiment automatically decreases transmitter audio amplifier gains in response to loud vocal inputs, such as when a telephone user speaks too closely to the microphone.

What is claimed is:

1. In a telephone including a transmitter for transmitting information, the information selectively including audio signals from a microphone incorporated into the telephone, the transmitter including audio circuitry to accept audio signals from the microphone and to provide amplified audio signals, and transmission circuitry to accept amplified audio signals from the audio circuitry, the transmitter audio circuitry comprising:

a microphone audio amplifier having an input operatively connected to the output of the microphone to receive audio signals from the microphone, and an output providing an amplified audio signal for processing in subsequent transmission circuitry as part of an operative communication to the receiver of a communicating telephone, said microphone audio amplifier having a gain which is selectable to maintain the power level of the amplified audio signal within a predetermined range of power levels, and having a gain control input to which gain selection information is supplied for use in setting the gain of said microphone audio amplifier, whereby said microphone audio amplifier gain is selected to compensate for a low volume input audio signal from the microphone, to provide an amplified audio signal having an improved signal to noise ratio;

a gain controller operatively connected to said gain control input of said microphone audio amplifier for supplying gain control information to said microphone audio amplifier; and a user-operable selector operatively connected to said controller for selecting the gain of said microphone audio amplifier, whereby the signal to noise ratio of the transmitted signal carrying a low volume audio input is improved to provide the speaker of communicating telephone receiver with an increased volume audio signal.

2. A telephone transmitter audio circuit as in claim 1 including an indicator operatively connected to the output of said audio amplifier and responsive to the power level of the amplified audio signal, whereby the power level of the amplified audio signal is monitored by the telephone user.

3. A telephone transmitter audio circuit as in claim 2 in which said indicator is calibrated to indicate when the amplified audio signal is distorted due to excessive audio signal amplification.

4. A telephone transmitter audio circuit as in claim 3 in which said indicator is an audible tone generator, said tone generator creating an audible tone in response to the amplified audio signal having a power level greater than a predetermined maximum normal threshold for the amplified audio signal, whereby the telephone user is alerted to an increase in audio input signal power.

5. A telephone transmitter audio circuit as in claim 1 in which the telephone includes a telephone case, and said user-operable selector is a switch mounted on said case, whereby control of the audio amplifier gain is intermittently selectable by means of said switch while the telephone is in use.

6. A telephone transmitter audio circuit as in claim 5 in which the telephone is adapted for carrying audio signals at different power levels that predominately originate from voice inputs into the microphone at various volumes, including at least a normal audio signal level corresponding to an audio signal with a power level greater than a predetermined minimum normal threshold and a low audio signal level corresponding to an audio signal with a power level less than the minimum normal threshold, said user-operable selector including at least normal and high gain selections, the normal gain selection being a default selection to set said audio amplifier to a first gain for use with normal audio signal levels, and the high gain selection to set said audio amplifier to a second gain, a predetermined amount greater than the first gain, for use with low audio signal levels, whereby high audio amplifier gain is intermittently selectable to compensate for low volume voice inputs.

7. A telephone transmitter audio circuit as in claim 6 including an indicator operatively connected to the output of said audio amplifier to alert the user whenever the following occurs:

high audio amplifier gain has been selected; and the power level of the amplified audio signal exceeds a predetermined maximum normal threshold for the amplified audio signal, whereby the telephone user is alerted to audio signal distortion due to excessive audio signal amplification.

8. A telephone transmitter audio circuit as in claim 5, including an audio signal power detector having an input operatively connected to the input of said audio amplifier and an output operatively connected to said gain controller to measure the power level of the audio signals, and in which the telephone is adapted for carrying audio signals at different power levels that predominately originate from voice inputs into the microphone at various volumes, including at least a normal audio signal level corresponding to an audio signal with a power level greater than a predetermined minimum normal threshold and a low audio signal level corresponding to an audio signal with a power level less than the minimum normal threshold, said user-operable selector including at least normal and first automatic gain selections, the normal gain selection being a default selection to set said audio amplifier to a first gain for use with the normal audio signal levels, and the first automatic gain selection to supply gain control information to said audio amplifier in a manner that is inversely proportional to the power level of the audio signals measured by said power detector for use with low audio signal levels, whereby automatic amplifier gain control is intermittently selectable to compensate for a low volume voice inputs.

9. A telephone transmitter audio circuit as in claim 1, including an audio signal power detector having an input operatively connected to the input of said audio amplifier and an output operatively connected to said gain controller to measure the power level of the audio signals, and in which the telephone is adapted for carrying audio signals at different power levels that predominately originate from voice inputs to the microphone at various volumes, including at least a normal audio signal level corresponding to an audio signal with a power level less than a predetermined maximum normal threshold and a high audio signal level corresponding to an audio signal with a power level greater than the maximum normal threshold, said user-operable selector including at least a second automatic gain selection to set said audio amplifier gain as follows:

whenever said power detector measures the audio signal power level to be less than the maximum normal threshold, said audio amplifier being set to a first gain for use with normal audio signal levels; and whenever said power detector measures the audio signal power level to be greater than the maximum normal threshold, said audio amplifier gain being set in a manner inversely proportional the power level of the audio signal for use with high audio signal levels, whereby a telephone user is automatically protected from audio signal distortion due to high volume voice inputs.

10. A telephone transmitter audio circuit as in claim 1, including an audio signal power detector having an input operatively connected to the input of said audio amplifier and an output operatively connected to said gain controller to measure the power level of the audio signals, and in which the telephone is adapted for carrying audio signals at different volume levels that predominately originate from voice inputs into the microphone at various volumes, including at least a normal audio signal level corresponding to an audio signal with a power level greater than a predetermined minimum normal threshold and a low audio signal level corresponding to an audio signal with a power level less than the minimum normal threshold, said user-operable selector including at least normal and high gain with override gain selections, the normal gain selection being a default selection to set said audio amplifier to a first gain for use with normal audio signal levels, and the high gain with override selection to set said audio amplifier gain as follows:

whenever said power detector measures the power level of the audio signals to be less than the minimum normal threshold, said audio amplifier being set to a second gain, a predetermined amount greater than the first gain, for use with low audio signal levels; and whenever said power detector measures the power level of the audio signal to be greater than the minimum normal threshold, said selector automatically changing from the high gain selection to select the normal gain selection, and said audio amplifier being set to the first gain therefrom, whereby a telephone user selecting high amplifier gain is automatically protected from audio signal distortion due to excess amplification of the audio signal.

11. In a handheld cellular telephone including a transmitter for transmitting information, the information selectively including audio signals from a microphone incorporated into the telephone, the transmitter including audio circuitry to accept audio signals from the microphone and to provide amplified audio signals, and transmission circuitry to accept amplified audio signals from the audio circuitry, the transmitter audio circuitry comprising:

a microphone audio amplifier having an input operatively connected to the output of the microphone to receive audio signals from the microphone, and an output providing an amplified audio signal for processing in subsequent transmission circuitry as part of an operative communication to the receiver of a communicating telephone, said microphone audio amplifier having a gain which is selectable to maintain the power level of the amplified audio signal within a predetermined range of power levels, and having a gain control input to which gain selection information is supplied for use in setting the gain of said microphone audio amplifier, whereby said microphone audio amplifier gain is selected to compensate for low volume input audio signal from the microphone, to provide an amplified audio signal having an improved signal to noise ratio;

a gain controller operatively connected to said gain control input of said microphone audio amplifier for supplying gain control information to said microphone audio amplifier; and a user-operable selector operatively connected to said controller for selecting the gain of said microphone audio amplifier, whereby the signal to noise ratio of the transmitted signal carrying a low volume audio input is improved to provide the speaker of communicating telephone receiver with an increased volume audio signal.

12. A cellular telephone transmitter audio circuit as in claim 11 including an indicator operatively connected to the output of said audio amplifier and responsive to the power level of the amplified audio signal, whereby the power level of the amplified audio signal is monitored by the cellular telephone user.

13. A cellular telephone transmitter audio circuit as in claim 12 in which said indicator is calibrated to indicate when the amplified audio signal is distorted due to excessive audio signal amplification.

14. A cellular telephone transmitter audio circuit as in claim 13 in which said indicator is an audible tone generator, said tone generator creating an audible tone in response to the amplified audio signal having a power level greater than a predetermined maximum normal threshold for the amplified audio signal, whereby the cellular telephone user is alerted to an increase in audio input signal power.

15. A cellular telephone transmitter audio circuit as in claim 11 in which the cellular telephone includes a telephone case, and said user-operable selector is a switch mounted on said case, whereby control of the audio amplifier gain is intermittently selectable by means of said switch while the cellular telephone is in use.

16. A cellular telephone transmitter audio circuit as in claim 15 in which the cellular telephone is adapted for carrying audio signals at different power levels that predominately originate from voice inputs into the microphone at various volumes, including at least a normal audio signal level corresponding to an audio signal with a power level greater than a predetermined minimum normal threshold and a low audio signal level corresponding to an audio signal with a power level less than the minimum normal threshold, said user-operable selector including at least normal and high gain selections, the normal gain selection being a default selection to set said audio amplifier to a first gain for use with normal audio signal levels, and the high gain selection to set said audio amplifier to a second gain, a predetermined amount greater than the first gain, for use with low audio signal levels, whereby high audio amplifier gain is intermittently selectable to compensate for low volume voice inputs.

17. A cellular telephone transmitter audio circuit as in claim 16 including an indicator operatively connected to the output of said audio amplifier to alert the user whenever the following occurs:
  high audio amplifier gain has been selected; and
  the power level of the amplified audio signal exceeds a predetermined maximum normal threshold for the amplified audio signal, whereby the cellular telephone user is alerted to audio signal distortion due to excessive audio signal amplification.

18. A cellular telephone transmitter audio circuit as in claim 15, including an audio signal power detector having an input operatively connected to the input of said audio amplifier and an output operatively connected to said gain controller to measure the power level of the audio signals, and in which the cellular telephone is adapted for carrying audio signals at different power levels that predominately originate from voice inputs into the microphone at various volumes, including at least a normal audio single level corresponding to an audio signal with a power level greater than a predetermined minimum normal threshold and a low audio signal level corresponding to an audio signal with a power level less than the minimum normal threshold, said user-operable selector including at least normal and first automatic gain selections, the normal gain selection being a default selection to set said audio amplifier to a first gain for use with the normal audio signal levels, and the first automatic gain selection to supply gain control information to said audio amplifier in a manner that is inversely proportional to the power level of the audio signals measured by said power detector for use with low audio signal levels, whereby automatic audio amplifier gain control is intermittently selectable to compensate for a low volume voice inputs.

19. A cellular telephone transmitter audio circuit as in claim 11, including an audio signal power detector having an input operatively connected to the input of said audio amplifier and an output operatively connected to said gain controller to measure the power level of the audio signals, and in which the cellular telephone is adapted for carrying audio signals at different power levels that predominately originate from voice inputs to the microphone at various volumes, including at least a normal audio signal level corresponding to an audio signal with a power level less than a predetermined maximum normal threshold and a high audio signal level corresponding to an audio signal with a power level greater than the maximum normal threshold, said user-operable selector including at least a second automatic gain selection to set said audio amplifier gain as follows:
  whenever said power detector measures the audio signal power level to be less than the maximum normal threshold, said audio amplifier being set to a first gain for use with normal audio signal levels; and
  whenever said power detector measures the audio signal power level to be greater than the maximum normal threshold, said audio amplifier gain being set in a manner inversely proportional the power level of the audio signal for use with high audio signal levels, whereby a cellular telephone user is automatically protected from audio signal distortion due to high volume voice inputs.

20. A cellular telephone transmitter audio circuit as in claim 11, including an audio signal power detector having an input operatively connected to the input of said audio amplifier and an output operatively connected to said gain controller to measure the power level of the audio signals, and in which the cellular telephone is adapted for carrying audio signals at different volume levels that predominately originate from voice inputs into the microphone at various volumes, including at least a normal audio signal level corresponding to an audio signal with a power level greater than a predetermined minimum normal threshold and a low audio signal level corresponding to an audio signal with a power level less than the minimum normal threshold, said user-operable selector including at least normal and high gain with override selections, the normal gain selection being a default selection to set said audio amplifier to a first gain for use with normal audio signal levels, and the high gain with override selection to set said audio amplifier gain as follows:
  whenever said power detector measures the power level of the audio signals to be less than the minimum normal threshold, said audio amplifier being set to a second gain, a predetermined amount greater than the first gain, for use with low audio signal levels; and whenever said power detector measures the power level of the audio signal to be greater than the minimum normal threshold, said selector automatically changing from the high gain selection to select the normal gain selection, and said audio amplifier being set to the first gain therefrom, whereby a cellular telephone user selecting high audio amplifier gain is automatically protected from audio signal distortion due to excess amplification of the audio signal.

21. In a telephone including a transmitter portion for transmitting information and a receiver portion for receiving information, the information selectively including audio signals from a microphone incorporated into the telephone and audio signals supplied to a speaker incorporated into the telephone and received via the receiver portion, the transmitter portion including audio circuitry to accept audio signals from the microphone and to provide amplified audio signals, and transmission circuitry to accept amplified audio signals from the audio circuitry, the telephone transmitter audio circuitry comprising:

a microphone audio amplifier having an input operatively connected to the output of the microphone to receive audio signals from the microphone, and an output providing an amplified audio signal for processing in subsequent transmission circuitry as part of an operative communication to the receiver of a communicating telephone, said microphone audio amplifier having a gain which is selectable to maintain the power level of the amplified audio signal within a predetermined range of power levels, and having a gain control input to which gain selection information is supplied for use in setting the gain of said microphone audio amplifier, whereby said microphone audio amplifier gain is selected to compensate for a low volume input audio signal from the microphone, to provide an amplified audio signal having an improved signal to noise ratio;

a gain controller operatively connected to said gain control input of said microphone audio amplifier for supplying gain control information to said microphone audio amplifier; and a user-operable selector operatively connected to said controller for selecting the gain of said microphone audio amplifier, said selector being operated in a manner independent of audio signals used in the receiver portion of the telephone, whereby the signal to noise ratio of the transmitted signal carrying a low volume audio input is improved to provide the speaker of communicating telephone receiver with an increased volume audio signal.

22. A telephone transmitter audio circuit as in claim 21 including an indicator operatively connected to the output of said audio amplifier and responsive to the power level of the amplified audio signal, whereby the power level of the amplified audio signal is monitored by the telephone user.

23. A telephone transmitter audio circuit as in claim 22 in which said indicator is calibrated to indicate when the amplified audio signal is distorted due to excessive audio signal amplification.

24. A telephone transmitter audio circuit as in claim 23 in which said indicator is an audible tone generator, said tone generator creating an audible tone in response to the amplified audio signal having a power level greater than a predetermined maximum normal threshold for the amplified audio signal, whereby the telephone user is alerted to an increase in audio input signal power.

25. A telephone transmitter audio circuit as in claim 21 in which the telephone includes a telephone case, and said user-operable selector is a switch mounted on said case, whereby control of the audio amplifier gain is intermittently selectable by means of said switch while the telephone is in use.

26. A telephone transmitter audio circuit as in claim 25 in which the telephone is adapted for carrying audio signals at different power levels that predominately originate from voice inputs into the microphone at various volumes, including at least a normal audio signal level corresponding to an audio signal with a power level greater than a predetermined minimum normal threshold and a low audio signal level corresponding to an audio signal with a power level less than the minimum normal threshold, said user-operable selector including at least normal and high gain selections, the normal gain selection being a default selection to set said audio amplifier to a first gain for use with normal audio signal levels, and the high gain selection to set said audio amplifier to a second gain, a predetermined amount greater than the first gain, for use with low audio signal levels, whereby high amplifier gain is intermittently selectable to compensate for low volume voice inputs.

27. A telephone transmitter audio circuit as in claim 26 including an indicator operatively connected to the output of said audio amplifier to alert the user whenever the following occurs:

high audio amplifier gain has been selected; and the power level of the amplified audio signal exceeds a predetermined maximum normal threshold for the amplified audio signal, whereby the telephone user is alerted to audio signal distortion due to excessive audio signal amplification.

28. A telephone transmitter audio circuit as in claim 26, in which the telephone is a handheld cellular telephone.

29. A telephone transmitter audio circuit as in claim 25, including an audio signal power detector having an input operatively connected to the input of said audio amplifier and an output operatively connected to said gain controller to measure the power level of the audio signals, and in which the telephone is adapted for carrying audio signals at different power levels that predominately originate from voice inputs into the microphone at various volumes, including at least a normal audio signal level corresponding to an audio signal with a power level greater than a predetermined minimum normal threshold and a low audio signal level corresponding to an audio signal with a power level less than the minimum normal threshold, said user-operable selector including at least normal and first automatic gain selections, the normal gain selection being a default selection to set said audio amplifier to a first gain for use with the normal audio signal levels, and the first automatic gain selection to supply gain control information to said audio amplifier in a manner that is inversely proportional to the power level of the audio signals measured by said power detector for use with low audio signal levels, whereby automatic amplifier gain control is intermittently selectable to compensate for a low volume voice inputs.

30. A telephone transmitter audio circuit as in claim 29, in which the telephone is a handheld cellular telephone.

31. A telephone transmitter audio circuit as in claim 21, including an audio signal power detector having an input operatively connected to the input of said audio amplifier and an output operatively connected to said gain controller to measure the power level of the audio signals, and in which the telephone is adapted for carrying audio signals at different power levels that predominately originate from voice inputs into the microphone at various volumes, including at least a normal audio signal level corresponding to an audio signal with a power level less than a predetermined maximum normal threshold and a high audio signal level corresponding to an audio signal with a power level greater than the maximum normal threshold, said user-operable selector including at least a second automatic gain selection to set said audio amplifier gain as follows:

whenever said power detector measures the audio signal power level to be less than the maximum normal threshold, said audio amplifier being set to a first gain for use with normal audio signal levels; and whenever said power detector measures the audio signal power level to be greater than the maximum normal threshold, said audio amplifier gain being set in a manner inversely proportional the power level of the audio signal for use with high audio signal levels, whereby a telephone user is automatically protected from audio signal distortion due to high volume voice inputs.

32. A telephone transmitter audio circuit as in claim 21, including an audio signal power detector having an input operatively connected to the input of said audio amplifier and an output operatively connected to said gain controller to measure the power level of the audio signals, and in which the telephone is adapted for carrying audio signals at different volume levels that predominately originate from voice inputs into the microphone at various volumes, including at least a normal audio signal level corresponding to an audio signal with a power level greater than a predetermined minimum normal threshold and a low audio signal level corresponding to an audio signal with a power level less than the minimum normal threshold, said user-operable selector including at least normal and high gain with override gain selections, the normal gain selection being a default selection to set said audio amplifier to a first gain for use with normal audio signal levels, and the high gain with override selection to set said audio amplifier gain as follows:

whenever said power detector measures the power level of the audio signals to be less than the minimum normal threshold, said audio amplifier being set to a second gain, a predetermined amount greater than the first gain, for use with low audio signal levels; and whenever said power detector measures the power level of the audio signal to be greater than the minimum normal threshold, said selector automatically changing from the high gain selection to select the normal gain selection, and said audio amplifier being set to the first gain therefrom, whereby a telephone user selecting high amplifier gain is automatically protected from audio signal distortion due to excess amplification of the audio signal.

33. A telephone transmitter audio circuit as in claim 32, in which the telephone is a handheld cellular telephone.

34. A telephone transmitter audio circuit as in claim 21 in which the telephone is a handheld cellular telephone.

35. A method of compensating for a low volume voice input into the microphone of a telephone, wherein the audio signal output from the telephone transmitter audio circuitry is processed by subsequent transmission circuitry, the transmitted signal carrying the voice input as part of an operative communication with another telephone, the method comprising:

a) providing user selectivity in the gain of a microphone audio amplifier operatively connected between the microphone of the telephone and the transmission circuitry which transmits the signal carrying the voice input;

b) selectively increasing the gain of the microphone audio amplifier in response to a user activated input, the input being selectively activated when the user determines that the volume of the voice input is low enough to interfere with audible communication via the telephone; and c) maintaining the output of the microphone audio amplifier within a predetermined range of power levels, whereby the signal to noise ratio of the transmitted signal carrying a low volume voice input is improved to provide the speaker of communicating telephone receiver with an increased volume audio signal.

36. A method of compensating for a low volume voice input into the microphone of a telephone as in claim 35, including the further step of displaying an indicator signal which is proportional to the power level of the amplified audio signal output from the audio amplifier.

37. A method for compensating for a low volume voice input into the microphone of a telephone as in claim 36, including the further step of calibrating the indicator signal to display when the audio signal is distorted due to excessive audio signal amplification.

38. A method of compensating for a low volume voice input into the microphone of a telephone as in claim 37, including the further step of displaying the indicator signal as an audible tone when the amplified audio signal exceeds a predetermined maximum normal threshold power for the amplified audio signal.

39. A method of compensating for a low volume voice input into the microphone of a telephone as in claim 35, including a telephone case and a switch mounted on the case, and further comprising the step of selecting the audio amplifier gain by means of the switch.

40. A method of compensating for a low volume voice input into the microphone of a telephone as in claim 39, in which the telephone is adapted for carrying audio signals of different power levels, including at least a normal audio signal level corresponding to an audio signal with a power level greater than a predetermined minimum normal threshold and a low audio signal level corresponding to an audio signal with a power level less than the minimum normal threshold, and including the further step of selecting the audio amplifier gain from at least normal and high gain selections, the normal gain selection being a default setting to set the audio amplifier to a first gain for use with normal audio signal levels and the high gain selection to set the audio amplifier to a second gain level, a predetermined amount greater than the first gain, for use with low audio signal levels, whereby high audio amplifier gain is intermittently selectable to compensate for low-level voice inputs.

41. A method of compensating for a low volume voice input into the microphone of a telephone as in claim 40, including the step of displaying the indicator signal whenever the following steps occur:

f) high audio amplifier gain is selected; and g) the power level of the amplified audio signal is detected to be greater than a predetermined maximum normal threshold power for the amplified audio signal, whereby the telephone user is alerted to excessive amplification of the audio signal.

42. A method of compensating for a low volume voice input into the microphone of a telephone as in claim 39, in which the telephone is adapted for carrying audio signals of different power levels, including at least a normal audio signal level corresponding to an audio signal with a power level greater than a predetermined minimum normal threshold and a low audio signal level corresponding to an audio signal with a power level less than the minimum normal threshold, and comprising the following steps:

d) operatively detecting the power level of the audio signal; and e) selecting the audio amplifier gain from a selection including at least normal and first automatic gain selections, the normal gain selection being a default selection to set the audio amplifier to a first gain for use with the normal audio signal level, and the first automatic gain selection to supply gain control information to the audio amplifier in a manner that is inversely proportional to the detected power level of the audio signal for use with the low audio signal levels, whereby automatic amplifier gain control is intermittently selectable to compensate for a low volume voice input.

43. A method of compensating for a low volume voice input into the microphone of a telephone as in claim 35, in which the telephone is adapted for carrying audio signals of different power levels, including at least a normal audio signal level corresponding to an audio signal with a power level greater than a predetermined minimum normal threshold and a low audio signal level corresponding to an audio signal with a power level less than the minimum normal threshold, and comprising the following steps:

h) operatively detecting the power level of the audio signal; and i) selecting the audio amplifier gain from a selection including at least normal and high gain with override gain selections, the normal gain selection being a default selection to set the audio amplifier to a first gain for use with the normal audio signal level, and the high gain with override selection to supply gain control information to the audio amplifier as follows:

1) when the power level of the audio signal is detected to be less than the minimum normal threshold, selecting said audio amplifier to be set to a second gain, a predetermined amount greater than the first gain, for use with the low audio signal level; and 2) when the power level of the audio signal is detected to be greater than the minimum normal threshold, changing the gain selection from the high gain selection to the normal gain selection, and the audio amplifier being set to the first gain therefrom, whereby a telephone user selecting high audio amplifier gain for a low audio signals is automatically protected from audio signal distortion due to excess amplification of the audio signal.

44. A method of compensating for a high volume voice input into the microphone of a telephone adapted for carrying audio signals at different power levels, including at least a normal audio signal level corresponding to an audio signal with a power level less than a predetermined maximum normal threshold and a high audio signal level corresponding to an audio signal with a power level greater than the maximum normal threshold, wherein the audio signal output of the telephone transmitter audio circuitry is processed by subsequent transmission circuitry, the transmitted signal carrying the voice input as part of an operative communication with another telephone, the method comprising:

a) providing user selectivity in the gain of a microphone audio amplifier operatively connected between the microphone of the telephone and the transmission circuitry which transmits the signal carrying the audio signal;

b) detecting the power level of the audio signal; and c) selectively decreasing the gain of the microphone audio amplifier in response to gain control input, the input being selectively activated when it is determined that the power level of the audio signal is high enough to interfere with audible communication via the telephone, the microphone audio amplifier gain selection including at least a second automatic gain selection to supply gain control information to the microphone audio amplifier as follows:

1) whenever the power level of the audio signal is detected to be less than the maximum normal threshold, selecting the microphone audio amplifier to be set to a first gain for use with normal audio signal levels; and 2) when the power of the audio signal is detected to be greater than the maximum normal threshold, selecting the microphone audio amplifier gain to be set in a manner inversely proportional to the power level of the audio signal for use with high audio signal levels, whereby a telephone user is automatically protected from audio signal distortion due to loud volume voice inputs.

45. In a handheld cellular telephone, housed in a telephone case, including a transmitter portion for transmitting information and a receiver portion for receiving information, the information selectively including audio signals from a microphone incorporated into the telephone and audio signals supplied to a speaker incorporated into the telephone and received via the receiver portion, the transmitter portion including audio circuitry to accept audio signals from the microphone and to provide amplified audio signals, and transmission circuitry to accept the amplified audio signals from the audio circuitry, the telephone transmitter audio circuitry comprising:

a microphone audio amplifier having an input operatively connected to the output of the microphone to receive audio signals from the microphone, and an output providing an amplified audio signal for processing in subsequent transmission circuitry as part of an operative communication to the receiver of a communicating telephone, said microphone audio amplifier having a gain which is selectable to maintain the power level of the amplified audio signal within a predetermined range of power levels, and having a gain control input to which gain selection information is supplied for use in setting the gain of said microphone audio amplifier, whereby said microphone audio amplifier gain is selected to compensate for a low volume input audio signal from the microphone, to provide an amplified audio signal having an improved signal to noise ratio;

a gain controller operatively connected to said gain control input of said microphone audio amplifier for supplying gain control information to said microphone audio amplifier; and a switch for said gain controller mounted on said case for user-operable selection of at least a normal and a high microphone audio amplifier gain, the normal gain selection being the default selection to set said microphone audio amplifier to a first gain for use with audio signals from the microphone having a power level greater than a minimum normal threshold and the high gain selection to set said microphone audio amplifier to a second gain, a predetermined amount greater than the first gain for use with audio signals from the microphone having a power level less than a minimum normal threshold, whereby the gain of said microphone audio amplifier is intermittently and selectively increased to compensate for a low-level voice input to provide the speaker of communicating telephone receiver with an increased volume audio signal.

* * * * *